United States Patent [19]

Dakin

[11] Patent Number: 4,638,153
[45] Date of Patent: Jan. 20, 1987

[54] OPTICAL FIBRE SENSING ARRANGEMENTS

[75] Inventor: John P. Dakin, Burridge, England

[73] Assignee: Plessey Overseas Limited, Ilford, England

[21] Appl. No.: 611,998

[22] Filed: May 18, 1984

[30] Foreign Application Priority Data

May 26, 1983 [GB] United Kingdom ............... 8314570

[51] Int. Cl.$^4$ ............................................. H01J 5/16
[52] U.S. Cl. ................................. 250/227; 356/345; 356/351
[58] Field of Search ............... 250/231 R, 227, 225; 350/96.29; 324/96, 351; 356/365, 345

[56] References Cited

U.S. PATENT DOCUMENTS 4,215,576  8/1980  Quick et al. ...................... 356/365
4,442,350  4/1984  Rashleigh ........................... 324/96
4,515,436  5/1985  Howard et al. .................. 350/96.29

Primary Examiner—David C. Nelms
Assistant Examiner—L. W. Madoo
Attorney, Agent, or Firm—Fleit, Jacobson, Cohn & Price

[57] ABSTRACT

An optical sensing arrangement suitable for the detection of acoustic waves and/or temperature or magnetic field changes, comprises a laser light source for producing polarized light which in operation of the arrangement will be applied for detection purposes to the input end of an optical sensor for transmission therethrough, whereby a relative phase delay is produced between orthogonal components of the polarized light at the output end of the optical sensor, characterized in that a relative phase delay compensation device is optically coupled to and so orientated with respect to one end of the sensor, that the relative phase delay between the orthogonally polarized components transmitted through the compensation device and the corresponding relative phase delay of these components in the optical sensor are mutually opposite, thereby reducing the noise content of an output signal derived from the arrangement and fed to polarization analyzer for producing an indication of structural changes which have occurred in the optical sensor.

8 Claims, 3 Drawing Figures

OPTICAL FIBRE SENSING ARRANGEMENTS

This invention relates to optical fibre sensing arrangements, as may be used for example as optical acoustic sensors in hydrophones or as remote temperature or magnetic field sensors.

Optical fibre sensing arrangements are known comprising a single mode polarisation-maintaining fibre to one end of which is applied polarised light (optimally polarised at 45° to the orthogonal axes of polarisation of the optical fibre) derived from a moderately coherent light source such as a semiconductor laser. The light output from the optical fibre may be analysed to determine the change in polarisation of the light at the output compared to the input due to variations in relative phase delays or differential changes in phase velocities between the orthogonally resolved components of the polarised light input. This change in polarisation can be utilised to provide an indication of changes in length of the optical fibre such as due to the impingement thereon of acoustic waves or the subjection of the fibre to changing temperatures. The detection of magnetic fields could also be accomplished by providing the fibre with a magnetostrictive coating.

One major diasdvantage with such known optical sensing arrangements results from the large phase velocity difference between the orthogonal polarisations in the polarisation-maintaining optical fibre. The resultant effective path length difference or relative phase delay along the fibre between orthogonally polarised signals causes problems due to the noise signals which are produced in the aforesaid moderately coherent light source (e.g. semiconductor laser) and which are increased approximately in proportion to the effective path length difference or relative phase delay between orthogonally polarised signals.

The above-mentioned disadvantage of the optical sensing arrangements concerned are at least alleviated in accordance with the present invention by the inclusion in such arrangements of compensation means for providing a relative phase delay between orthogonally polarised signals travelling therethrough and optically coupled and orientated with respect to the aforesaid polarisation-maintaining optical fibre so that the relative phase delay in the polarisation-maintaining fibre and the relative phase delay compensation means are mutually opposite and preferably fully equalised and mutually cancelling. By the cancellation of the relative phase delay noise is effectively eradicated from the output of the sensing arrangement.

According to one manner of carrying out the present invention the compensation means may comprise a second polarisation-maintaining optical fibre which affords the same relative phase delay between orthogonally polarised signals as the sensing fibre and which may have one end (e.g. output end) thereof butt-jointed or fuse-welded to one end (e.g. input end) of the sensing fibre so that the two optical fibres are arranged co-axially but with the orthogonal polarisation axes of the respective fibres being angularly displaced with respect to one another by 90°. Such an optical sensing arrangement is suitable for detecting acoustic waves and temperature changes, or magnetic fields if the fibre is provided with a magnetostructure coating. However, in order to avoid insensitivity to such parameters it will readily be apparent that the sensor fibre should be isolated from the compensation fibre. For the detection of acoustic waves the two optical fibres could be arranged by suitable potting or otherwise to have large differences in mechanical coupling to the acoustic influence which is to be detected and/or measured. In the fabrication of an optical sensing arrangement having sensing and compensation optical fibres it is only necessary to cut one fibre in half and then rejoin the two halves to ensure the requisite balancing compensation.

According to another manner of carrying out the present invention the compensation means may comprise a bi-refringent crystal located preferably between the laser source and the input end of the sensor fibre with the orthogonal polarisation axes of the crystal being angularly rotated through 90° with respect to the corresponding axes of the sensor fibre. The use of bi-refringent crystals as the compensating means is only really suitable in arrangements for the detection of acoustic signals by the fibre sensor.

In yet another manner of carrying out the present invention the compensation means comprises a bi-refringent crystal and the sensor fibre is replaced by a bi-refringent crystal.

The present invention will be more fully understood from the following description of embodiments of the invention read in conjunction with the accompanying drawing in which.

Figure 1:
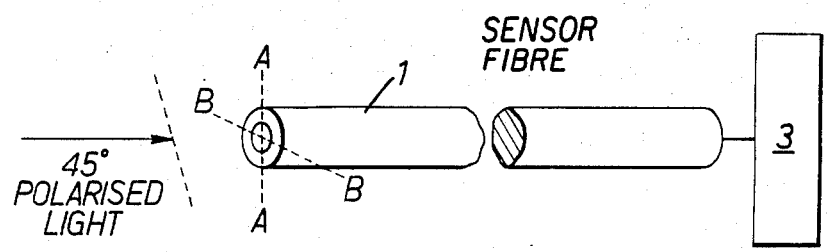
FIG. 1 is a diagram of a known optical fibre sensing arrangement.

Referring to FIG. 1, this shows a single mode polarisation-maintaining optical fibre 1 which constitutes a sensor which may be used for detecting acoustic waves impinging on the fibre or for detecting temperature or pressure changes. Still further, the fibre may be coated with a magneto-strictive coating so that the sensor may be used for detecting magnetic fields. In operation of this known sensing arrangement light polarised at 45° to the orthogonal polarisation axes A and B of the polarisation maintaining fibre 1 is applied to one end of the optical fibre.

The polarisation of the light emerging at the output end of the optical fibre 1 is analysed by means of a polarisation analyser 3 to provide an indication of deformation or strain, or changes thereof, which the fibre undergoes, as for instance when an acoustic wave impinges on the fibre.

A principal drawback of this arrangement stems from the fact that the polarised input to the fibre 1 will be resolved into components along the two orthogonal polarisation axes of the fibre and the phase velocities of these resolved components differ so that the components effectively have different path lengths or a relative phase delay along the fibre. This effective difference in path lengths or relative phase delay causes an increase in noise produced at the detector as a result of imperfect coherence of the laser used for generating the light input and this noise can render the polarisation analysis inaccurate.

With a view to overcoming this noise problem the present invention provides a compensating arrangement for effectively cancelling the effective path length difference or relative phase delay between orthogonally polarised signal components.

Figure 2:
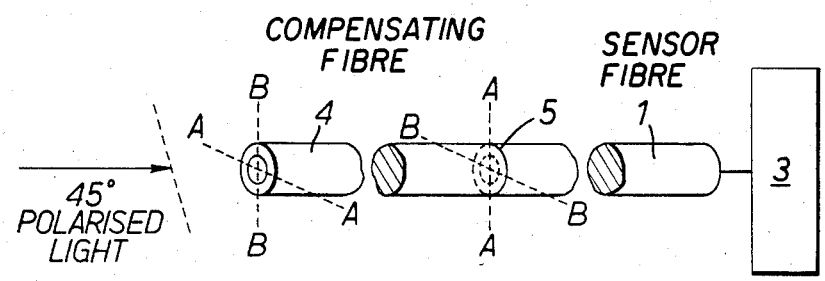
FIG. 2 is a diagram of an optical fibre sensing arrangement according to the invention; and, FIG. 3 is a diagram of an alternative optical fibre sensing arrangement according to the invention.

In FIG. 2 the compensating arrangement comprises a single mode optical fibre 4 the characteristics of which match the sensor fibre 1. The compensating fibre 4 however, is arranged with its orthogonal polarisation axes A and B angularly displaced by 90° with respect to the corresponding axes A and B of the sensor fibre 1 and the two optical fibres 1 and 4 are coaxial and the adjacent ends thereof may be butt-jointed or fuse-welded together as indicated at 5.

As will readily be appreciated the effective path lengths for the resolved orthogonal polarisation components of the input light will be different in each of the fibres 1 and 4 but due to the angular displacement of the polarisation axes of the respective fibres by 90° the overall effective path lengths for the resolved components will be equalised to cancel the relative phase delay therebetween and therefore amplification of noise produced by the laser will be avoided. It may here be mentioned that this arrangement could also be used to measure pressure gradients between areas in which the two fibres 1 and 4 are respectively located. It will also be appreciated that in use of the arrangement the sensor fibre will be isolated from the compensating fibre to enable changes in polarisation of the sensor fibre only to be detected by the polarisation analyser.

Figure 3:
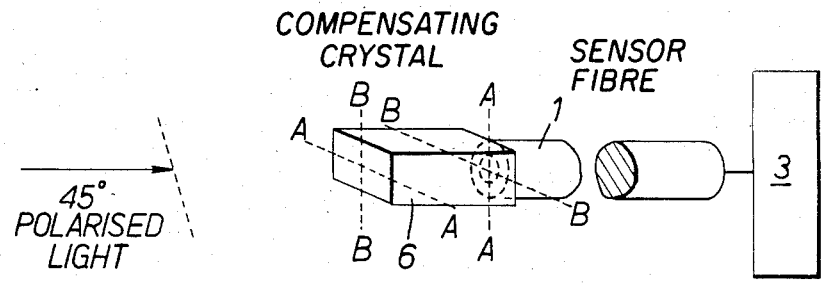

Referring to FIG. 3, in this arrangement compensation is provided by means of bi-refringent crystal 6 which may be located with one face against one end of the fibre 1 as shown. As in the case of the compensating fibre 4 of FIG. 2 arrangement the orthogonal polarisation axes A and B of the crystal 6 are angularly displaced by 90° with respect to the corresponding axes of the sensor fibre 1. The effect of interposing the crystal 6 between the laser and the sensor fibre 1 is to equalise the effective overall path lengths of the orthogonally resolved light components to cancel the relative phase delay therebetween and thereby avoid the problem of noise amplification. In a modified sensing arrangement the sensor fibre is replaced by a bi-refringent crystal, the orthogonal polarisation axes of the two abutting crystals being angularly rotated through 90° with respect to one another.

The crystal compensation arrangement is only suitable for use in arrangements for measuring transient mechanical strains since the crystal characteristics are not matched in every way to the characteristics of the sensor fibre and therefore slow changes in ambient temperature and ambient pressures would cause problems.

What is claimed is:

1. An optical arrangement suitable for the detection of acoustic waves and/or temperature or magnetic field changes, comprising means for producing polarised light which in operation of the arrangement will be applied for detection purposes to the input end of an optical sensor for transmission therethrough, whereby a relative phase delay is produced between orthogonal components of the polarised light at the output end of the optical sensor, and relative phase delay compensation means optically coupled to and so orientated with respect to one end of the sensor, that the relative phase delay between the orthogonally polarised components transmitted through the compensation means and the corresponding relative phase delay in the optical sensor are mutually opposite, thereby reducing the noise content of an output signal derived from the arrangement and fed to polarisation analyser means for producing an indication of structural changes which have occurred in the optical sensor.

2. An optical sensing arrangement as claimed in claim 1, in which the compensation means is interposed between the means for producing polarised light and the input end of the optical sensor.

3. An optical sensing arrangement as claimed in claim 1, in which the relative phase delay between the orthogonal components transmitted through the compensation means completely cancels the corresponding relative phase delay in the optical sensor.

4. An optical sensing arrangement as claimed in claim 1, in which the optical sensor comprises a polarisation-maintaining optical fibre.

5. An optical sensing arrangement as claimed in claim 4, in which the relative phase delay compensation means comprises a second polarisation-maintaining optical fibre which affords the same relative phase delay between the orthogonally polarised signals travelling therethrough as the optical sensor.

6. An optical sensing arrangement as claimed in claim 5, in which the two polarisation-maintaining optical fibres have their ends butt-jointed or fuse-welded together so that the two fibres are coaxial with their respective orthogonal polarisation axes angularly displaced with respect to one another by 90°.

7. An optical sensing arrangement as claimed in claim 4, in which the relative phase delay compensation means comprises a bi-refringent crystal which abuts one end of the optical fibre sensor and which has its orthogonal polarisation axes angularly rotated through 90° with respect to the corresponding axes of the sensor fibre.

8. An optical sensing arrangement as claimed in claim 2, in which the compensation means comprises a bi-refringent crystal.

* * * * *